United States Patent
Lee

(10) Patent No.: US 9,559,534 B2
(45) Date of Patent: Jan. 31, 2017

(54) DATA CABLE FOR FAST CHARGING

(71) Applicant: CRESYN CO., LTD., Seoul (KR)

(72) Inventor: Jong Bae Lee, Seoul (KR)

(73) Assignee: CRESYN CO., LTD., Seoul (KR)

( * ) Notice: Subject to any disclaimer, the term of this patent is extended or adjusted under 35 U.S.C. 154(b) by 200 days.

(21) Appl. No.: 14/407,808

(22) PCT Filed: Sep. 20, 2012

(86) PCT No.: PCT/KR2012/007522
§ 371 (c)(1),
(2) Date: Dec. 12, 2014

(87) PCT Pub. No.: WO2013/191327
PCT Pub. Date: Dec. 27, 2013

(65) Prior Publication Data
US 2015/0155729 A1   Jun. 4, 2015

(30) Foreign Application Priority Data
Jun. 21, 2012  (KR) .................. 10-2012-0066483

(51) Int. Cl.
*H02J 7/00* (2006.01)
*H01R 13/70* (2006.01)
*H01R 29/00* (2006.01)
*H01R 31/06* (2006.01)

(52) U.S. Cl.
CPC ............ *H02J 7/0044* (2013.01); *H01R 13/70* (2013.01); *H01R 29/00* (2013.01); *H01R 31/065* (2013.01)

(58) Field of Classification Search
CPC .................................................. H02J 7/0044
USPC ........................................................ 320/114
See application file for complete search history.

(56) References Cited

U.S. PATENT DOCUMENTS

| | | | |
|---|---|---|---|
| 6,465,987 B1 * | 10/2002 | Haas et al. | G06F 1/266 320/128 |
| 7,694,032 B2 * | 4/2010 | Lim | G06F 13/4081 710/14 |
| 2012/0289080 A1 | 11/2012 | Huang | |

FOREIGN PATENT DOCUMENTS

| | | |
|---|---|---|
| CN | 101231625 A | 7/2008 |
| CN | 202068063 U | 12/2011 |
| JP | 3318554 B2 | 8/2002 |
| JP | 2009-163517 A | 7/2009 |
| KR | 20-0352806 Y1 | 6/2004 |
| KR | 20-0385821 Y1 | 6/2005 |
| KR | 10-2007-0056253 A | 6/2007 |
| WO | 2009/063278 A1 | 5/2009 |

* cited by examiner

*Primary Examiner* — Sun Lin
(74) *Attorney, Agent, or Firm* — KORUS Patent, LLC; Seong Il Jeong

(57) ABSTRACT

A data cable for fast charging comprises: a cable for transmitting data and charging; a first connection unit which is disposed on one end of the cable so as to be connected to a power source; a second connection unit which is disposed on the other end of the cable so as to be connected to a mobile terminal; and a mode switching circuit which enables mode switching between a data transmission mode and a fast charging mode, wherein the mode switching circuit comprises: a terminal switching logic which applies an input voltage of the first connection unit; divided resistances; a switch for the mode switching between the data transmission mode and the fast charging mode; and an analog switching logic which responds to the switch for the mode switching.

8 Claims, 4 Drawing Sheets

(a)

(b)

DATA CABLE FOR FAST CHARGING

TECHNICAL FIELD

The present design relates to a data communication cable for a terminal and, more particularly, to a USB data cable used for data transmission and/or charging between a PC and a terminal having a secondary cell embedded therein using a USB port.

BACKGROUND ART

In general, the type of communication port chiefly used for data transmission includes a Universal Asynchronous Receiver Transmitter (UART) and a Universal Serial Bus (USB).

The UART is a device for processing asynchronous serial communication. Each of computers includes the UART in order to manage serial ports, and each of internal modems includes the UART. More specifically, the UART provides a computer with an RS-232C interface so that the computer can communicate with a modem or other serial devices or exchange data with a modem or other serial devices.

Furthermore, the USB is a peripheral access interface standard jointly proposed by 7 companies including IBM, and an object of the USB is to commonize an interface for connecting peripheral to a personal computer. If such a USB is used, all the peripherals can be connected to a personal computer without separately configuring software or hardware when the peripherals are connected to the personal computer. Accordingly, there are advantages in that the number of ports can be significantly reduced, installation is simple, and the size of a portable computer can be reduced.

In a prior art, Recommended Standard-232C (RS-232C) performed only data transmission between a mobile phone and a personal computer, but was problematic in the transmission of a large amount of data and a transfer rate and in that data and power could not be transmitted at the same time. In order to solve such problems, data transmission and charging are performed using a USB port. However, there is a problem in that the charging time is increased compared to charging using a dedicated adaptor, that is, a DC converter, if power is supplied using a USB terminal.

In techniques related to charging using a USB data cable, there are conventional techniques regarding a USB data cable that automatically detects the type of power in order to prevent overcharge, a USB data cable capable of randomly determining a charging time in order to prevent overcharge, and a USB data cable connected to a dedicated adaptor, that is, a DC converter. However, in charging using the USB terminal of a PC the use of the USB terminal is inconvenient because the charging time is very long. In the case of the USB data cable connected to the adaptor, there is inconvenience in terms of portability because a dedicated adaptor needs to be carried.

DISCLOSURE

Technical Problem

An object of the present invention is to provide a technology capable of fast charging through a switch to charging-dedicated mode after data transmission is finished if a terminal is connected to the USB terminal of a PC and data transmission and/or charging are performed using a USB data cable.

Technical Solution

A data cable capable of fast charging according to the present invention for achieving the above object includes a cable for data transmission and charging, a first connection unit provided to be connected to a power source on one end of both ends of the cable, a second connection unit provided to be connected to a portable terminal on the other end of the cable, and a mode switching circuit capable of mode switching between data transmission mode and fast charging mode, wherein the mode switching circuit comprises terminal switching logic that applies an input voltage to the first connection unit; distribution resistors; a switch for mode switching between the data transmission mode and the fast charging mode; and analog switching logic that responds to the switch for mode switching.

In the data cable capable of fast charging according to the present invention, the power source of the first connection unit is a USB terminal of a PC, the first connection unit is a USB connector, a terminal that supplies the input voltage is a USB VBUS terminal, and the distribution resistors are distribution terminals related to a USB D+ terminal and a USB D− terminal.

In the data cable capable of fast charging according to the present invention, the mode switching circuit and the switch for mode switching preferably are a mode switching circuit and a switch for mode switching for general purposes, which are capable of selecting fast charging mode according to the distribution resistors differently set by portable terminal providers in relation to the recognition of the USB D+ terminal and the USB D− terminal In the data cable capable of fast charging according to the present invention, the mode switching circuit and the switch for mode switching preferably are a dedicated mode switching circuit and a switch for mode switching dedicated to a terminal provider which are capable of mode switching according to a designated distribution resistor of a portable terminal provider in relation to the recognition of the USB D+ terminal and the USB D− terminal.

In the data cable capable of fast charging according to the present invention, the mode switching circuit and the switch for mode switching preferably are placed in any one of the first connection unit, the second connection unit, and the cable.

Advantageous Effects

The data cable capable of fast charging in accordance with the present invention has the following advantages.

First, data transmission and charging of 500 mAh or less are possible in data transmission mode and fast charging of more than 500 mAh is possible in fast charging mode using the switch for mode switching capable of mode switching between data transmission mode and fast charging mode. Accordingly, there is an advantage in that the time taken to charge a terminal having a high-capacity battery embedded therein is reduced.

Second, there is an advantage in that universality according to the switch for mode switching can be increased because the switch for mode switching is basically compatible with a USB battery charging specification and the distribution resistor is configured according to a terminal provider.

Third, there is an advantage in that usability and mobility can be improved because the switch for mode switching is integrated with the USB data cable.

Fourth, there is an advantage of a dedicated property in that the distribution resistor of a single terminal provider is used for each cable and used as a terminal-dedicated cable.

BEST MODE

Hereinafter, preferred embodiments of the present invention are described in detail with reference to the accompanying drawings.

Figure 1:
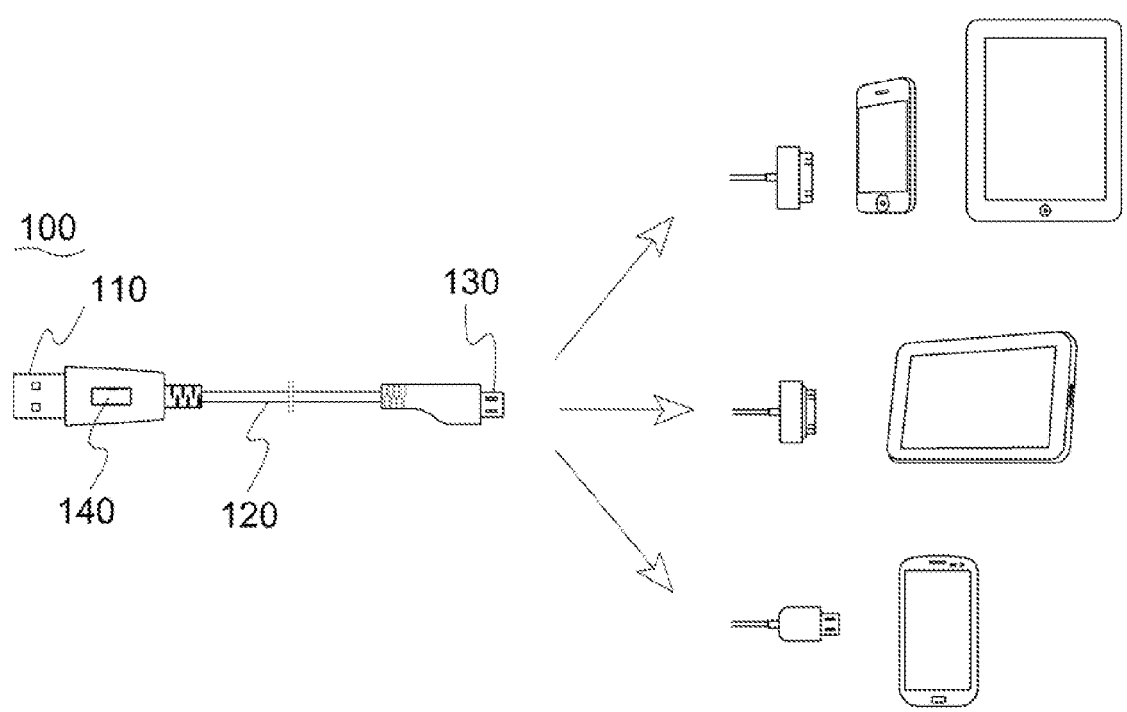
FIG. 1 is a perspective view of a USB data cable in accordance with an embodiment of the present invention.

FIG. 1 is a perspective view of a USB data cable in accordance with an embodiment of the present invention. In general, a second connection unit is a micro-USB connector, but may be a 20 pin connector or a 30 pin connector depending on terminal providers. FIG. 1 illustrates a dedicated USB data cable in which the second connection unit is fixed to the connector of a specific terminal provider. The USB data cable is configured to include a first connection unit 110, a cable 120 for data and charging, a second connection unit 130, and a switch 140 for mode switching. The first connection unit 110 is a part connected to a power source and corresponds to a USB terminal if the USB terminal of a PC is adopted as a power source. In the present embodiment, the switch 140 for mode switching is simplified and placed in the first connection unit, but a mode switching circuit (not illustrated) is further placed in the first connection unit. The switch 140 for mode switching that is dedicated to a specific terminal of a terminal provider is configured to select any one of charging and data transmission.

Figure 2:
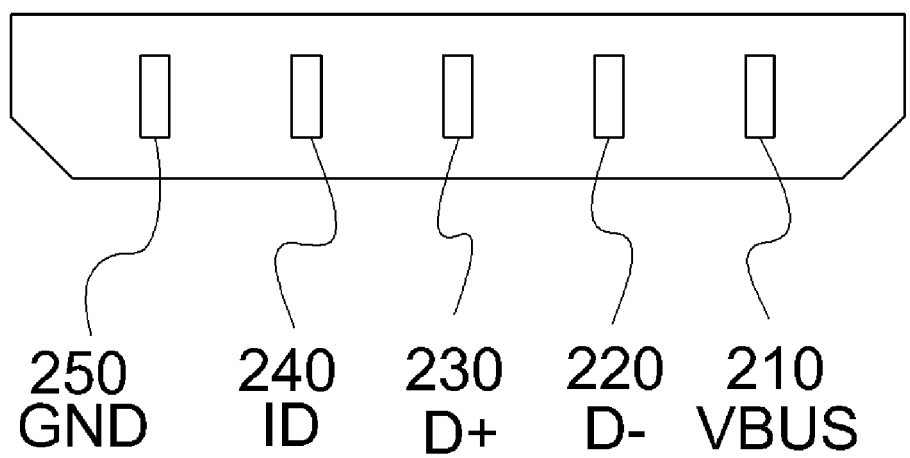
FIG. 2 illustrates the cross section of terminals when a second connection unit in accordance with an embodiment of the present invention is a 5 pin micro-USB terminal.

FIG. 2 is a diagram illustrating the cross section of terminals when the second connection unit in accordance with an embodiment of the present invention is a 5 pin micro-USB terminal. A reference voltage of 5 V output by the first connection unit as an output value is applied to a VBUS terminal 210, that is, the most right terminal, as input to a terminal connected to the second connection unit through the cable. That is, a D− terminal, that is, a second terminal, and a D+ terminal, that is, a third terminal, correspond to the data transmission terminals of the USB data cable. In relation to the distribution resistor of a terminal provider, the D+ terminal and the D− terminal are open or short-circuited in fast charging mode, and a portable terminal connected to the second connection unit recognizes that a charging adaptor is connected to the first connection unit. A fourth terminal corresponds to an ID terminal. In relation to the mechanism of the ID terminal, the ID terminal operates in accordance with Battery Charging Specification Revision 1.2. A GND terminal 250, that is, the last terminal, corresponds to a ground terminal.

Figure 3:
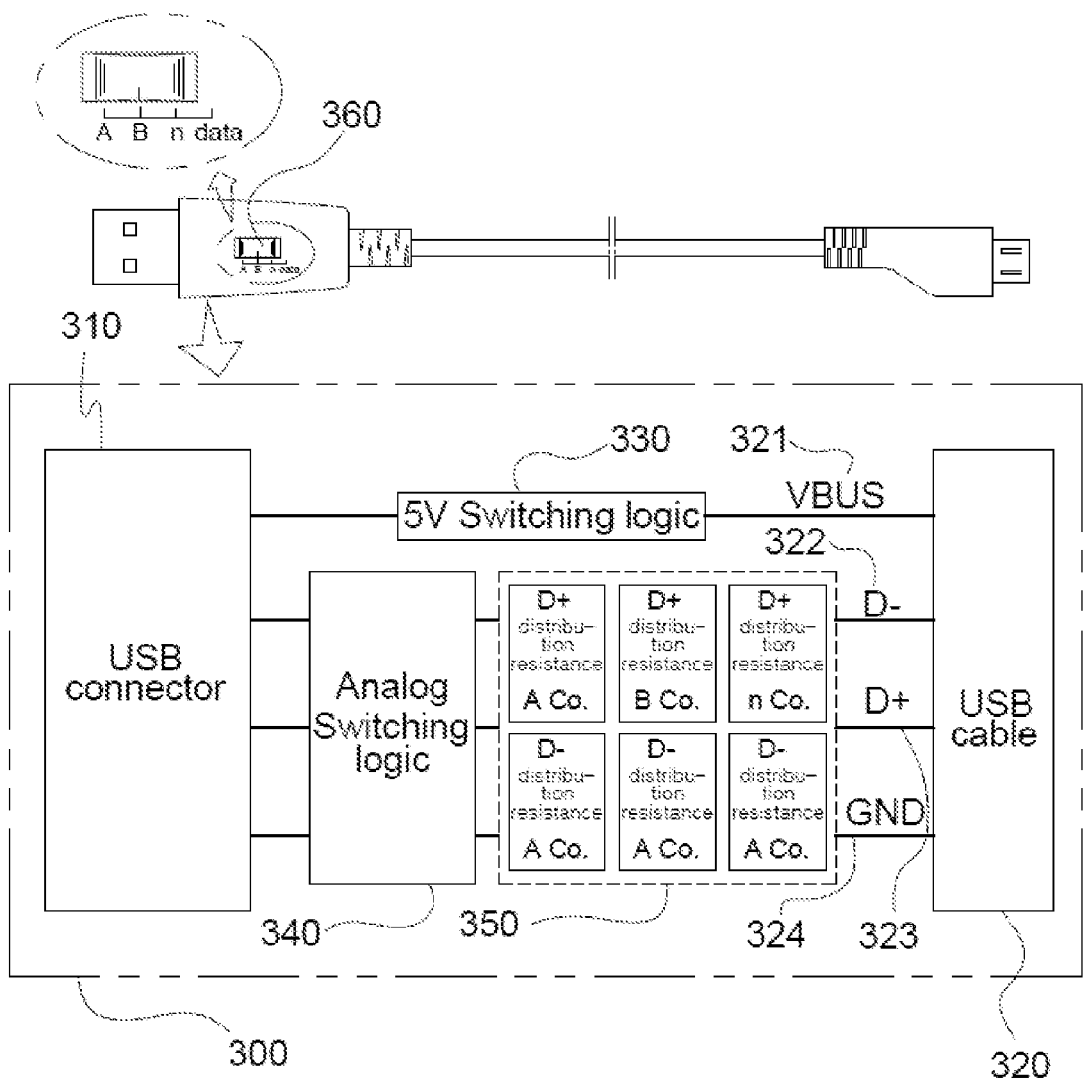
FIG. 3 illustrates a switch for mode switching in a first connection unit and a mode switching circuit within the first connection unit in accordance with an embodiment of the present invention.

FIG. 3 is a perspective view of the USB data cable in accordance with an embodiment of the present invention and is an enlarged diagram illustrating a mode switching circuit 300 between the first connection unit and the cable. In the enlarged mode switching circuit 300 of FIG. 3, a USB connector part corresponds to an embodiment of the first connection unit and is preferably connected to the USB terminal of a PC. Only four terminals that belong to the five internal terminals of the 5 pin micro-USB terminal illustrated in FIG. 2 and from which the ID terminal 240 is omitted are illustrated in FIG. 3. The second connection unit will be connected to the end of a USB cable 320 although not illustrated in FIG. 3.

In FIG. 3, in accordance with an embodiment of the present invention, the mode switching circuit and the switch for mode switching are placed in the USB connector of the first connection unit. The mode switching circuit and the switch for mode switching may be placed at a location close to a power source as described above, may be placed in the data cable (FIG. 4) like a lever for controlling the volume of an earphone, and may be placed in the connector (FIG. 4) of the second connection unit close to a terminal connected to the second connection unit.

The mode switching circuit of FIG. 3 is described below. A VBUS terminal is illustrated at the top of the four terminals. In a cable to which the VBUS terminal belongs, 5 V switching logic for controlling the switching of 5 V power is placed between the USB connector and the USB cable. A GND terminal 324 is a ground terminal. A D− terminal and a D+ terminal are terminals that send data if the USB cable is in data transmission mode. If a portable terminal connected to the second connection unit is charged with current of 500 mAh or less in data transmission mode, efficiency is low because the time taken to charge the portable terminal is longer than the time taken to charge the portable terminal using a dedicated adaptor directly connected to an electrical outlet. In accordance with an embodiment of the present invention, the switch 140 for mode switching in FIG. 1 has been illustrated in FIG. 3 as a switch 350 for mode switching for general purposes. In an embodiment, if portable terminal providers include a company A, a company B, and a company n, the distribution terminal of each company is included in the mode switching circuit. In FIG. 3, the location of a point at which the switch 350 for mode switching is selected may be any one of A, B, and n indicative of the portable terminal providers and data indicative of data transmission. If the location of a point at which the switch 350 for mode switching is selected is a location A, the D+ terminal and the D− terminal to which the distribution resistor of the company A are short-circuit and open, and fast charging mode of a portable terminal provided by the company A that is connected to the second connection unit is entered. If the location of a point at which the switch 350 for mode switching is selected is a location B or n indicative of a portable terminal provider, fast charging mode of a portable terminal provided by the company B or the company n is entered. If the location of a point at which the switch 350 for mode switching is selected is placed at data, the USB data cable is prepared to send data.

Figure 4:
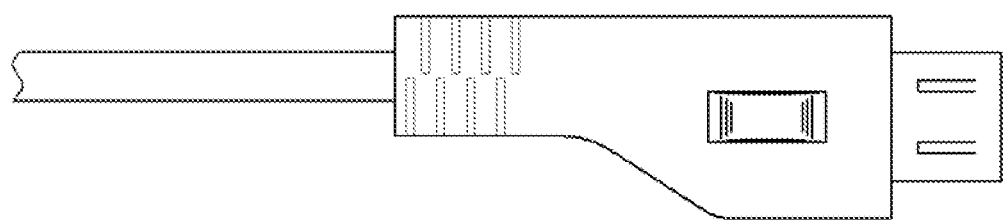
FIG. 4 illustrates the location of the switch for mode switching in accordance with an embodiment of the present invention.
Figure 4:

FIG. 4 illustrates a case (a) where the switch for mode switching is placed in the connector of the second connection unit and a case (b) where the switch for mode switching is placed in the middle of the cable in accordance with an embodiment of the present invention.

In accordance with another preferred embodiment, data transmission mode and fast charging mode can be automatically changed if a circuit for determining whether or not to send data is embedded instead of the switch for mode switching.

As described above, although the embodiments of the present invention have been described in detail with reference to the accompanying drawings, the aforementioned embodiments have been described in connection with preferred examples of the present invention. Accordingly, it is to be understood that the present invention should not be constructed as being limited to the embodiments and the scope of the present invention covers the following claims and equivalents thereof.

What is claimed is:

1. A data cable capable of fast charging, comprising:
a cable for data transmission and charging;
a first connection unit provided to be connected to a power source on a first end of the cable;
a second connection unit provided to be connected to a portable terminal on a second end of the cable; and
a mode switching circuit capable of mode switching between a data transmission mode and a fast charging mode,
wherein the mode switching circuit comprises a terminal switching logic that applies an input voltage to the first connection unit; distribution resistors; a switch for mode switching between the data transmission mode and the fast charging mode; and an analog switching logic that responds to the switch for mode switching.

2. The data cable of claim 1, wherein:
the power source of the first connection unit is a USB terminal of a PC,
the first connection unit is a USB connector,
a terminal that supplies the input voltage is a USB VBUS terminal, and
the distribution resistors are distribution terminals related to a USB D+ terminal and a USB D− terminal.

3. The data cable of claim 2, wherein the mode switching circuit and the switch for mode switching are a mode switching circuit and a switch for mode switching for general purposes, which are capable of selecting fast charging mode according to the distribution resistors differently set by portable terminal providers in relation to a recognition of the USB D+ terminal and the USB D− terminal.

4. The data cable of claim 2, wherein the mode switching circuit and the switch for mode switching are a dedicated mode switching circuit and a switch for mode switching dedicated to a terminal provider which are capable of mode switching according to a designated distribution resistor of a portable terminal provider in relation to a recognition of the USB D+ terminal and the USB D− terminal.

5. The data cable of claim 2, wherein the mode switching circuit and the switch for mode switching are placed in any one of the first connection unit, the second connection unit, and the cable.

6. The data cable of claim 1, wherein the mode switching circuit and the switch for mode switching are a mode switching circuit and a switch for mode switching for general purposes, which are capable of selecting fast charging mode according to the distribution resistors differently set by portable terminal providers in relation to a recognition of a USB D+ terminal and a USB D− terminal.

7. The data cable of claim 1, wherein the mode switching circuit and the switch for mode switching are a dedicated mode switching circuit and a switch for mode switching dedicated to a terminal provider which are capable of mode switching according to a designated distribution resistor of a portable terminal provider in relation to a recognition of a USB D+ terminal and a USB D− terminal.

8. The data cable of claim 1, wherein the mode switching circuit and the switch for mode switching are placed in any one of the first connection unit, the second connection unit, and the cable.

* * * * *